US007929993B2

(12) United States Patent
Nagarajan

(10) Patent No.: US 7,929,993 B2
(45) Date of Patent: Apr. 19, 2011

(54) MULTI-SIM-BASED MOBILE DEVICE

(75) Inventor: Sudhakar Nagarajan, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 713 days.

(21) Appl. No.: 11/847,478

(22) Filed: Aug. 30, 2007

(65) Prior Publication Data

US 2009/0061932 A1    Mar. 5, 2009

(51) Int. Cl.
*H04M 1/00* (2006.01)
*H04W 4/00* (2009.01)
*H04B 1/08* (2006.01)
*H04B 1/38* (2006.01)

(52) U.S. Cl. ............ 455/558; 455/435.2; 455/411; 455/349; 455/551; 455/557; 455/564; 455/565

(58) Field of Classification Search ........... 455/435.2, 455/411, 426, 349, 550–553, 556–558, 564–565, 455/569, 575
See application file for complete search history.

(56) References Cited

U.S. PATENT DOCUMENTS

| 5,711,013 | A  | * | 1/1998  | Collett et al. ........... 455/558 |
| 5,771,468 | A  | * | 6/1998  | Stein ..................... 455/561 |
| 6,006,104 | A  | * | 12/1999 | Metroka et al. ......... 455/551 |
| 6,366,777 | B1 | * | 4/2002  | Uusitalo ................. 455/433 |
| 2002/0016164 | A1 | * | 2/2002  | Mead et al. ............. 455/414 |
| 2002/0154632 | A1 | * | 10/2002 | Wang et al. ............. 370/389 |
| 2006/0234693 | A1 | * | 10/2006 | Isidore et al. ........ 455/422.1 |
| 2007/0054665 | A1 | * | 3/2007  | Elkarat et al. ........ 455/432.1 |
| 2007/0184858 | A1 | * | 8/2007  | Landschaft et al. ...... 455/466 |
| 2008/0020765 | A1 | * | 1/2008  | Black et al. ........... 455/435.2 |
| 2008/0020773 | A1 | * | 1/2008  | Black et al. ........... 455/445 |

* cited by examiner

*Primary Examiner* — Matthew D. Anderson
*Assistant Examiner* — Bobbak Safaipour
(74) *Attorney, Agent, or Firm* — Dillon & Yudell LLP

(57) ABSTRACT

A mobile device includes first identification circuitry and second identification circuitry. The first identification circuitry is associated with a first network and the second identification circuitry is associated with a second network. The mobile device simultaneously registers itself with the first and second networks using the first and second identification circuitry, respectively. The first and second identification circuitry may each comprise subscriber identity modules. The mobile devices handle outgoing and incoming calls based on user preferences. The user may override the preferences for selected calls.

14 Claims, 7 Drawing Sheets

MULTI-SIM-BASED MOBILE DEVICE

BACKGROUND OF THE INVENTION

1. Technical Field

The present invention relates generally to the field of mobile devices, and more particularly to a mobile telephone having more than one simultaneously active subscriber identity modules (SIMs).

2. Description of the Related Art

Mobile communication devices, such as cellular telephones, have become very common among the general public. With advances in technology, the costs of mobile communication equipment and services are continually being reduced. Mobile carriers offer various plans and packages and subscribers can pick among various carriers and plans so as to minimize their costs.

It has become common for individuals to own and/or carry multiple mobile devices. For example, a person may have one mobile phone for business use and another mobile phone for personal use. Also, a person may subscribe to multiple plans with one carrier or plans with multiple carriers. For example, one plan or package may offer free incoming calls and another package or plan may offer low-cost outgoing calls. Additionally, some people carry multiple mobile phones to protect their privacy. In such cases, one mobile device may be used for calls to and from family and friends while the other is used for calls to and from the general public.

The Global System for Mobile Communications (GSM) is one of the most popular standards for mobile phones in the world. One of the key features of GSM is the subscriber identity module (SIM), commonly known as a SIM card. The SIM is a detachable smartcard containing the user's subscription information and phonebook. This allows the user to retain his or her information after switching handsets. Alternatively, the user can also change plans or carriers while retaining the handset simply by changing the SIM card. Thus, a user can effectively have multiple mobile devices by possessing one handset and multiple SIMs.

SUMMARY OF THE INVENTION

The present invention provides a mobile device that is adapted to receive first identification circuitry and second identification circuitry. The first identification circuitry is associated with a first network and the second identification circuitry is associated with a second network, which may be the same as or different from the first network. The mobile device includes means for simultaneously registering itself with the first and second networks using the first and second identification circuitry, respectively. The first and second identification circuitry may each comprise subscriber identity modules (SIMs). Thus, embodiments of the present invention effectively provide multiple mobile devices combined into a single unit.

Embodiments of the present invention may include user preferences. An example of a user preference is a preferred SIM for outgoing calls. When the user physically places a call, the mobile device automatically uses the preferred SIM, whereby the call is placed through the preferred network using the preferred service plan. In some embodiments, the user may override the preference and place a call using the non-preferred SIM. Additionally, the user may specify exception preferences. For example, one SIM may be preferred for use during the day on weekdays while the other is preferred for use on weekends and during the evening on weekdays.

Normally, the mobile device can receive calls at any time for either SIM. The mobile device may include a feature similar to call waiting that enables the mobile device to handle calls for both SIMs at the same time. Embodiments of the present invention allow the user to toggle back and forth between calls on the two SIMs. Embodiments of the present invention may include an auto-answering feature. According to the auto-answering feature, when a call to the non-preferred SIM is received, the calling party can automatically be advised to call back on the preferred number.

BRIEF DESCRIPTION OF THE DRAWINGS

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying drawings, where:

DETAILED DESCRIPTION OF THE PREFERRED EMBODIMENT

Figure 1:
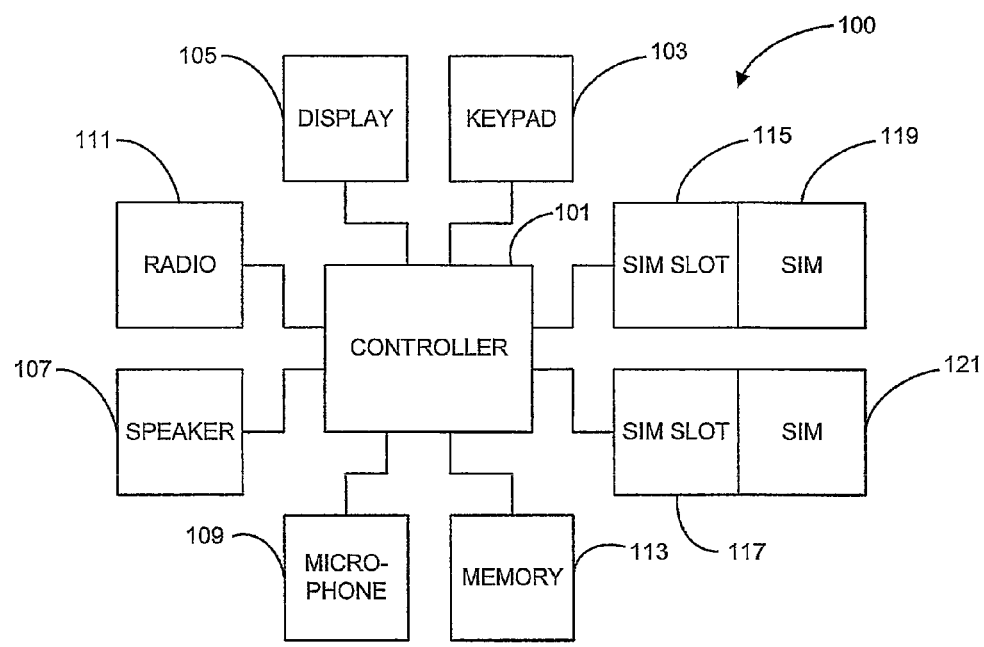
FIG. 1 is a block diagram of an embodiment of a mobile device according to the present invention.

Referring now to the drawings, and first FIG. 1, an embodiment of a mobile device system according to the present invention is designated generally by the numeral 100. Mobile device 100 includes a controller 101 that is programmed according to the present invention, as well as to perform other mobile device operations. Mobile device 100 includes a keypad 103 and the display 105, each coupled to controller 101. As is known to those skilled the art, keypad 103 includes various keys for entering telephone numbers and performing typical mobile device operations as well as operations according to the present invention. Display 105 may be a liquid crystal or other display commonly used in mobile devices. Mobile device 100 includes a speaker 107 and a microphone 109 coupled to controller 101. Mobile device 100 includes a radio 111 coupled to controller 101. Mobile device 100 includes a memory 113 coupled to controller 101. Mobile device 100 may preferably be housed in any number of conventional cellular telephone cases.

Mobile device 100 includes a first subscriber identity module (SIM) slot 115 and SIM slot 117 each coupled to controller 101. Each SIM slot 115 and 117 is adapted to receive a SIM card. In FIG. 1, SIM slot 115 is coupled to a SIM card 119. Similarly, SIM slot 117 is coupled to a SIM card 121. As is known to those skilled in the art, existing cellular telephone units include a door that provides access to a SIM card and slot in the back of the unit. As will be apparent to those skilled in the art, the two SIM slots 115 and 117 may be accessible through a similar door. Although, the present invention is illustrated and described with respect to a mobile unit including two SIM cards, those skilled in the art will recognized that embodiments of the present invention may include more than two SIM cards.

Figure 2:
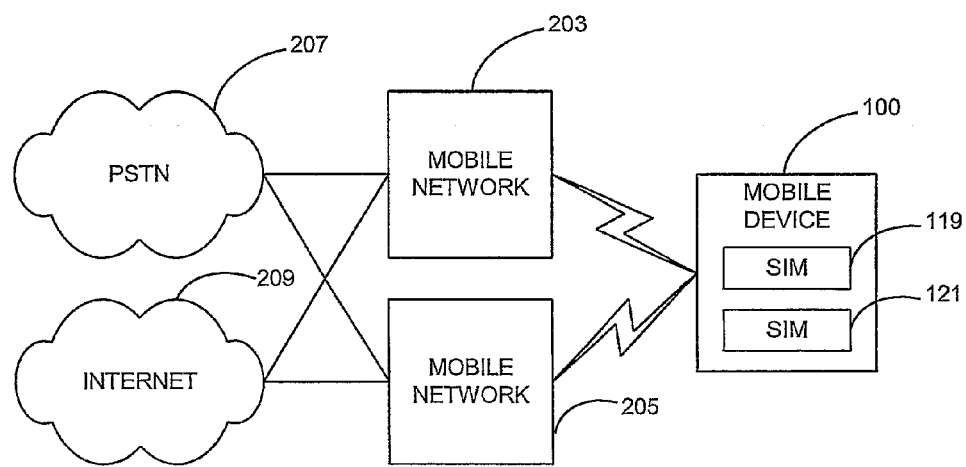
FIG. 2 is a block diagram of a communication system including an embodiment of a mobile device according to the present invention.

FIG. 2 as a high-level block diagram of a communication system 201 including a mobile device 100 according to the present invention. Communication system 201 includes a first mobile network 203 and a second mobile network 205. Mobile networks 203 and 205 are typical networks associated with any of various mobile carriers. As will be described in connection with FIG. 3, mobile networks 203 and 205 may be global packet relay system (GPRS) networks, or any other mobile type of network. Mobile network 203 is coupled to a public switched telephone network (PSTN) 207 and the Internet 209. Similarly, mobile network 205 is coupled to PSTN 207 and Internet 209. Mobile device 101 is coupled wirelessly to mobile networks 203 and 205. It should be recognized that mobile networks 203 and 205 may be the same network.

FIG. 2 is a block diagram of a typical mobile network, such as mobile network 203 of FIG. 1. Mobile network 203 includes a packet radio service (e.g., GPRS, EDGE, CDMA) system 301. Packet radio service system 301 enables a mobile device, such as mobile device 101, to access both a data network, such as the Internet 209, and a public switched telephone network (PSTN) 207. An originating mobile switching center (MSC-O) 303 provides an interface mobile network 203 and PSTN 207. In one embodiment where the packet radio service is GPRS, a home location register (HLR) 305 provides MSC-O 303 subscriber and location information for the mobile devices in its home area. A gateway mobile switching center (G-MSC) 307 is connected to MSC-O 303 and a visitor location register (VLR) 309. VLR 309 provides location information to HLR 305. A servicing mobile switching center (MSC-S) 311 is connected to G-MSC 307 and a VLR 313. VLR 313 provides location information to HLR 305. MSC-S 311 is connected to a plurality of base stations, including base stations 315 and 317, which use digital control channels (DCCHs) for paging and registration of mobile units and their respective areas.

A gateway GPRS support node print (GGSN) 319 provides an interface between Internet 209 and mobile network 203. A GPRS HLR 321 provides GGSN 319 with location and subscriber information. GGSN 319 and GPRS HLR 321 are in communication with a servicing GPRS support node (SGSN) 323, which communicates with mobile devices in its area through a plurality of base stations, including base stations 325 and 327. Base stations 325 and 327 use packet control channels (PCCHs) for paging and registration of mobile units in their respective areas.

Figures 3, 4:
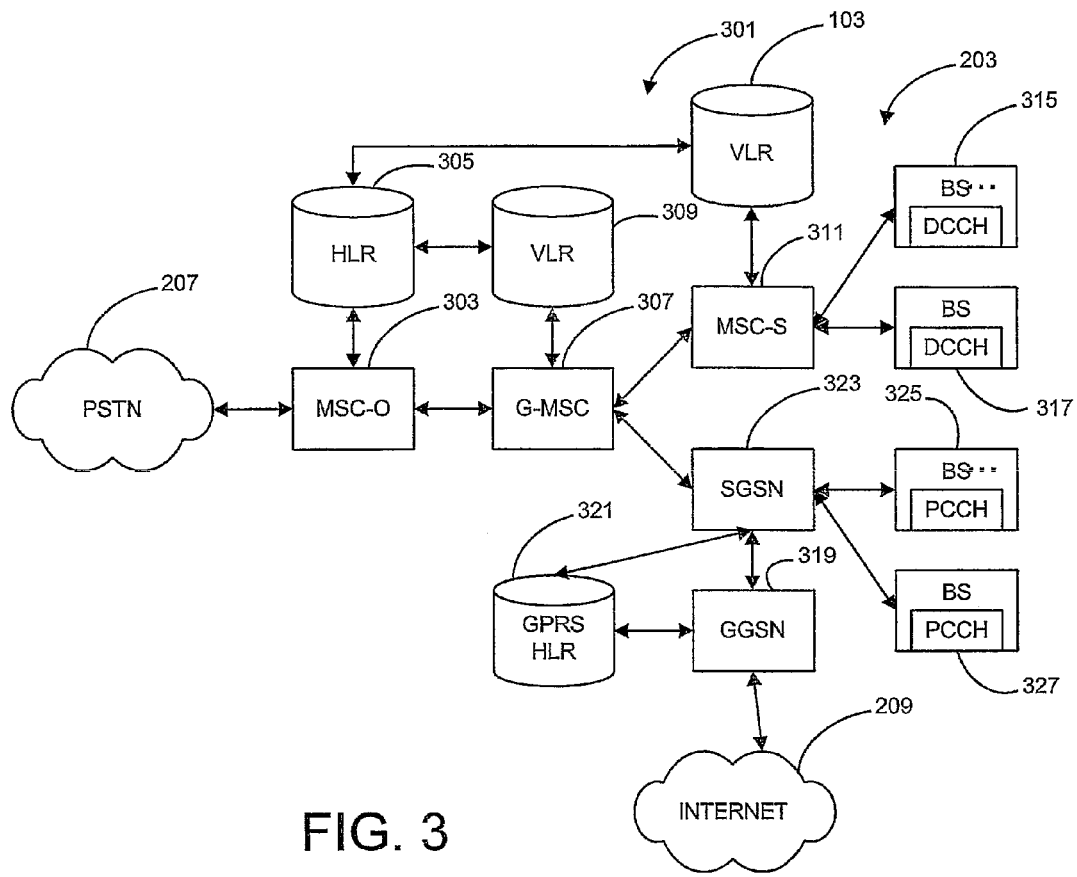
FIG. 3 is a block diagram of a typical cellular telephone system.
FIG. 4 is an illustration of an embodiment of a user preference table according to the present invention.

FIG. 4 illustrates a table 401 of user preferences according to an embodiment of the present invention. A user may set preferences whereby one SIM card will be used as the preferred or default SIM card for outgoing calls. Thus, table 401 includes a preferred entry 403, which in the illustrated embodiment is denoted as SIM-A. A user may specify exceptions under which the other SIM card will be used. Thus, table 401 includes a date/Time exceptions 405. In the illustrated embodiment, the other SIM card will be used for outgoing calls weekdays between 9 p.m. and 6 a.m. and all day on the weekends. In the embodiment of FIG. 4, the user may set an auto answer feature, as indicated by entry 407. When the auto answer feature is on, incoming calls to the non-preferred SIM will be answered with a message instructing the calling party to call back on the number of the preferred SIM. Preference table 401 includes an override feature 409, which enables the user to override the preferred SIM for a particular call. For example, when SIM-A is the preferred SIM, the user can press an override key and use the other SIM for making an outgoing call. It will be recognized that the preferences listed in the table of FIG. 4 are only examples of preferences and features that may be made available in a mobile device according to the present invention. All features available in cellular phones and the like may be incorporated into mobile devices according to the present invention, as will be apparent to those skilled in the art.

Figure 5:
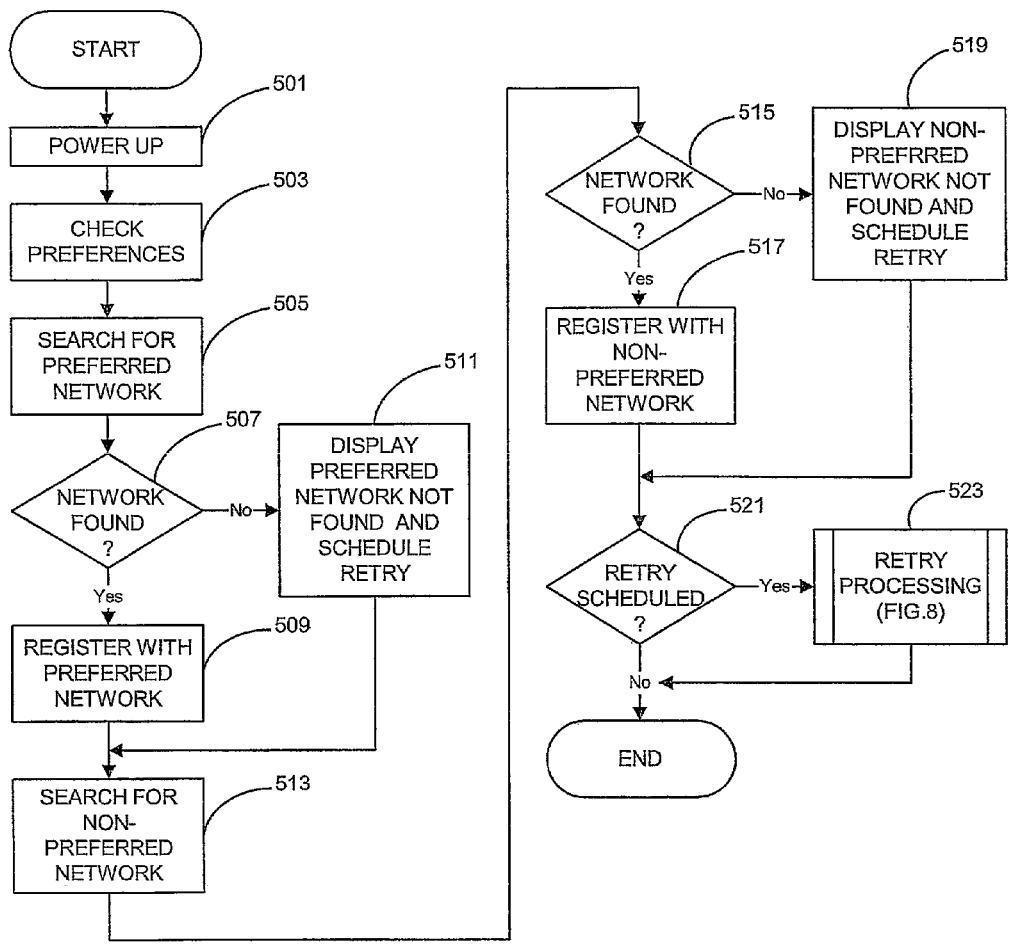
FIG. 5 is a flow chart of an embodiment of registration processing according to the present invention.

FIG. 5 is a flow chart of an embodiment of registration processing according to the present invention. Power up is initiated at block 501. The mobile device controller checks preferences, as indicated at block 503. Then, the mobile device searches for the preferred network, as indicated at block 505. If, as determined at decision block 507, the preferred network is found, the mobile device registers with the preferred network, as indicated at block 509. If, as determined at decision block 507, the preferred network is not found, the mobile displays a preferred network not found message and schedules a retry, as indicated at block 511. Then, the mobile device searches for the non-preferred networks, as indicated at block 513. If, as determined at decision block 515, the non-preferred network is found, the mobile device registers with the non-preferred network, as indicated at block 517. If, as determined at decision block 515, the non-preferred network is not found, the mobile device displays a non-preferred network not found message and schedules a retry, as indicated at block 519. If, as determined at decision block 521, a retry is scheduled at block 511 and/or block 519, the mobile device performs retry processing, as indicated generally at block 523 and described in detail with reference to FIG. 8. After registration and successful retry, if any, the mobile device is ready to make calls to and receive calls from both the preferred and non-preferred networks according to user preferences.

Figure 6:
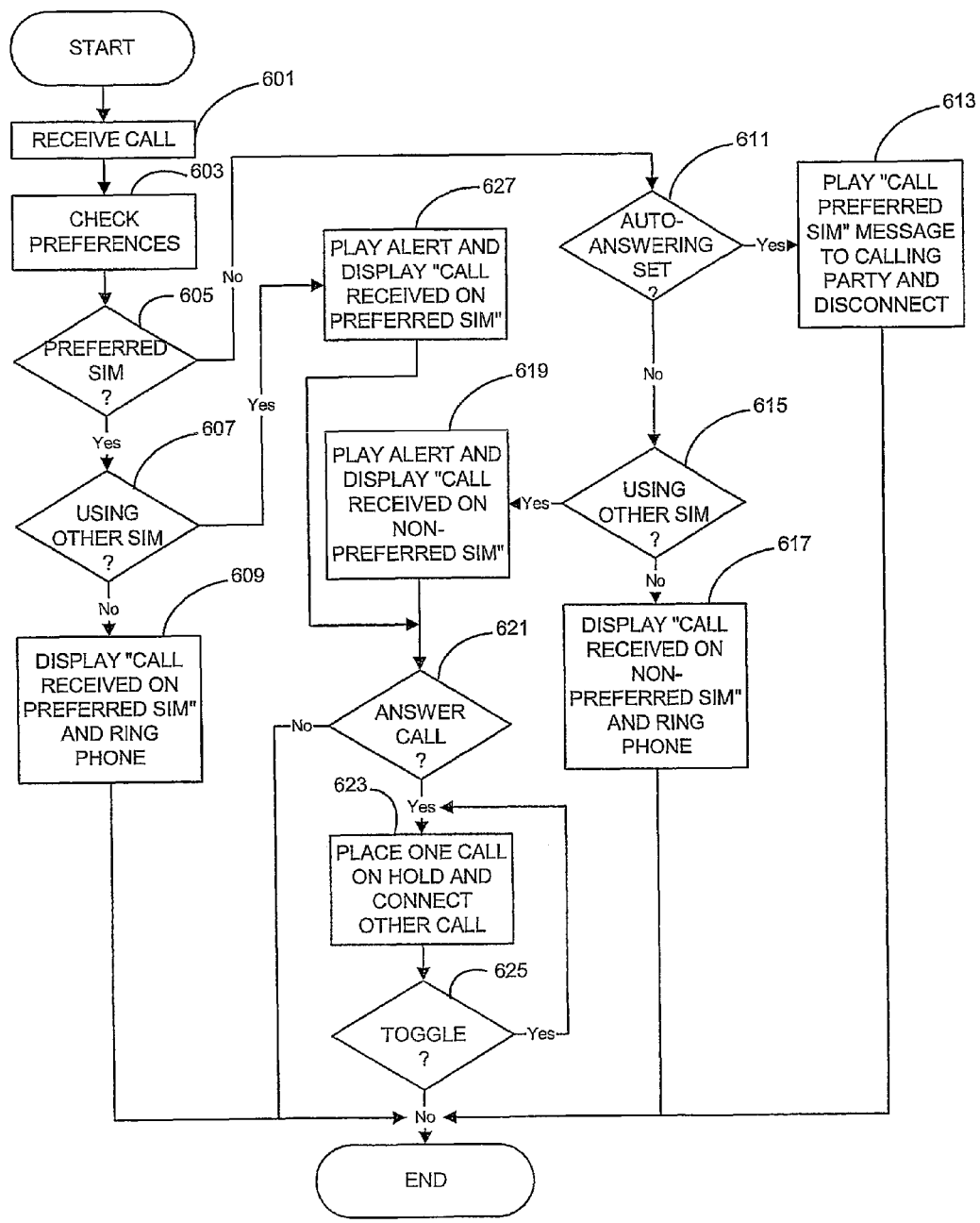
FIG. 6 is a flow chart of an embodiment of call receiving processing according to the present invention.

FIG. 6 is a flow chart of an embodiment of call receipt processing according to the present invention. The mobile device receives a call, as indicated at block 601. The mobile device checks the preferences, as indicated at block 603. If, as determined at decision block 605, the call is for the preferred SIM, the mobile device checks, at decision block 607, if the user is using the other SIM. The embodiment illustrated in FIG. 6 includes a feature similar to call waiting with which the mobile device may be used for simultaneous calls using both SIM's. If, as determined at decision block 607, the mobile devices not using the other SIM, the mobile device displays a call received on preferred SIM message and rings the phone, as indicated at block 609.

Referring back to decision block 605, if the call received is not for the preferred SIM, the mobile device determines, at decision block 611, if auto answering is set. Auto answering is a mobile phone feature that automatically answers and performs some automated processing of a call. If auto answering is set, the mobile device delivers to the calling party a message to call back on the preferred SIM and disconnects, as indicated at block 613. The message to call back may be a recorded voice announcement stored in the memory of the mobile device or other form of message such as a short message system (SMS) message. Other automated call processing may be performed if auto answering is set. For example, auto answering may be configured to send an SMS to the mobile device that there is an incoming call on the non-preferred SIM. The SMS may include such information is the identity of the calling party, the time of the call, etc. The calling party may also be able to record a voice message instead of calling back on the preferred SIM. If, as determined at decision block 611, auto-answering is not set, the mobile device determines, at decision block 615, if the mobile device is currently using the other SIM. If not, the mobile device displays a call received on the non-preferred SIM message and rings the phone, as indicated at block 617. If, as determined at block 615, the mobile device is currently using the other SIM for a call, the mobile device plays an audible alert, which may similar to a call waiting alert, to the user and displays a call received on the non-preferred SIM message, as indicated at block 619. The mobile device then waits for the user to answer the call. The user can answer the call by pressing a button on the keypad in the same way that the user answers a call waiting call. If, as determined at decision block 621, the user answers the call, the mobile device places one of the calls on hold and connects the other call, as indicated at block 623. As indicated at decision block 625, the user can toggle back-and-forth between the calls.

Referring back to decision block 607, if the user is using the other SIM for a call, which in this case is the non-preferred SIM, the mobile device plays an audible alert and displays a call received on the non-preferred SIM message, as indicated at block 627. Then, processing proceeds to decision block 621.

Figure 7A:
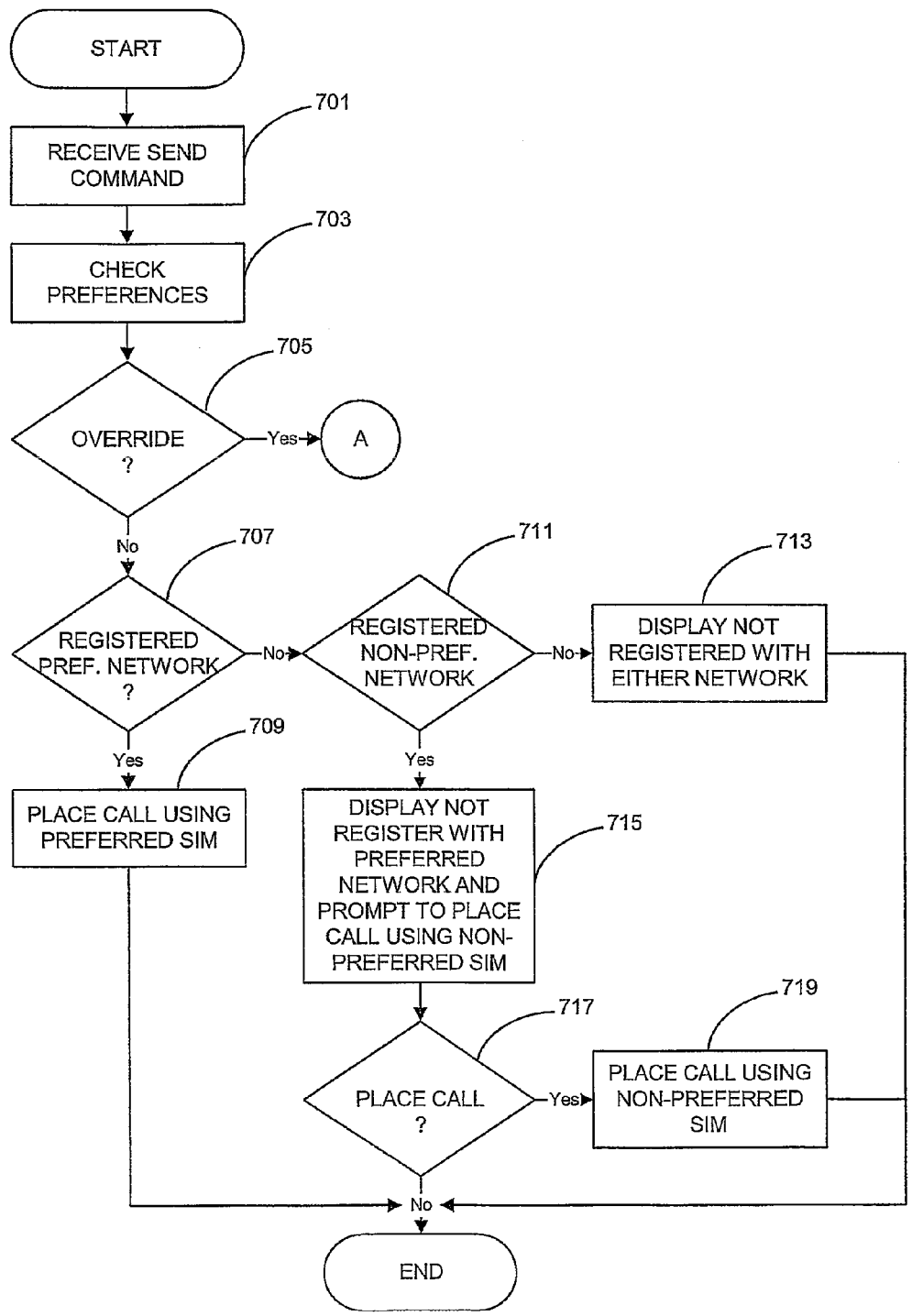
FIGS. 7A and 7B comprise a flow chart of an embodiment of call placing processing according to the present invention; and, FIG. 8 is a flow chart of an embodiment of retry processing according to the present invention.
Figure 7B:
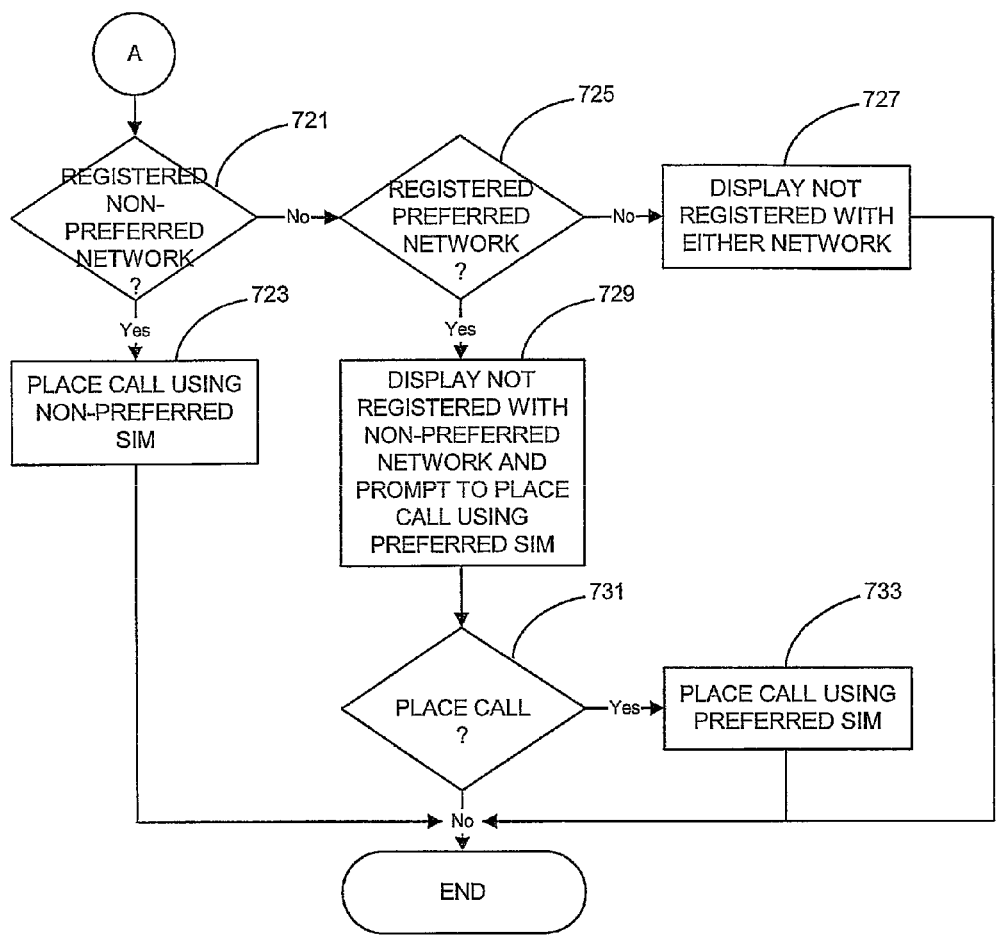

FIGS. 7A and 7B comprise a flow chart of outgoing call processing according to an embodiment of the present invention. As is typical in the cellular phone art, a user enters digits on the keypad and then presses a send button to make a call. The mobile device receives a send command, at block 701. Then, the mobile device checks preferences, at block 703. Embodiments of the present invention may include an override feature that enables the user to make a particular call on the non-preferred SIM. If, as determined at decision block 705, override is set, processing proceeds to FIG. 7B. If, as determined at decision block 705, override is not set, the mobile device determines, at decision block 707, if it is registered with the preferred network. If so, the mobile device places the call using the preferred SIM, as indicated at block 709. If, as determined at decision block 707, the mobile device is not registered with the preferred network, the mobile device determines, at decision block 711, if it is registered with the non-preferred network. If not, the mobile device displays a not registered with either network message, as indicated at block 713, and processing ends. If, as determined at block 711, the mobile device is registered with the non-preferred network, but is mobile device displays a not registered with the preferred network message and prompts the user to place the call using the non-preferred SIM, as indicated at block 715. Thus, the user may choose whether or not to use the non-preferred SIM to place the call. If, as determined at decision block 717, the user chooses to place the call, the mobile device places a call using the non-preferred SIM, as indicated at block 719.

Referring to FIG. 7B, if the user is chosen to override the preferred SIM, the mobile device determines, at decision block 721, if the mobile device is registered with the non-preferred network. If so, the mobile device places call using the non-preferred SIM, as indicated at block 723. If, as determined at decision block 721, the mobile device is not registered with the non-preferred network, the mobile device determines, at decision block 725 if it is registered with the preferred network. If not, the mobile device displays a not registered with the network message, as indicated at block 727. If, as determined at decision block 725, the mobile device is registered with the preferred network, the mobile device displays a not registered with non-preferred network message and prompts the user to place a call using the preferred SIM, as indicated at block 729. If, as determined at decision block 731, the user elects to place the call, the mobile device places the call using the preferred SIM, as indicated at block 733.

Figure 8:
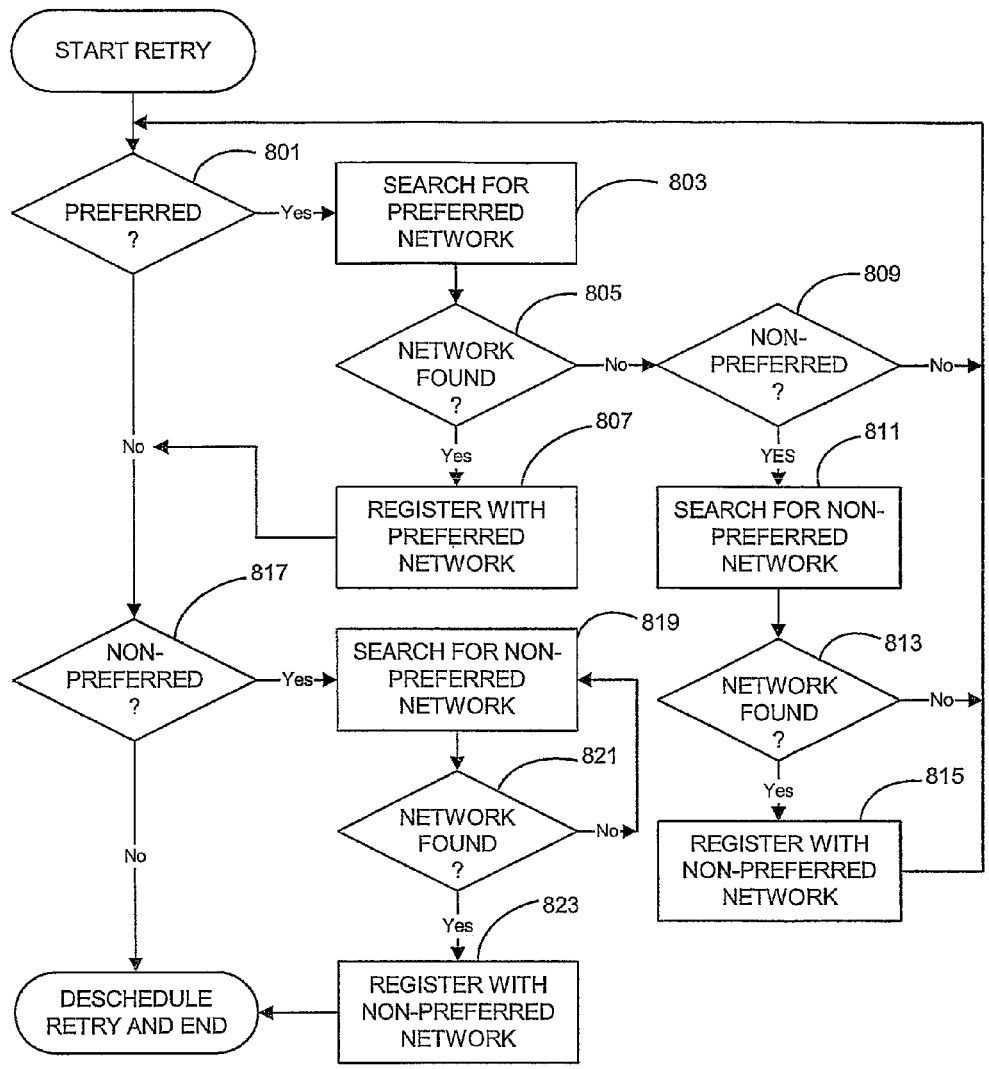

FIG. 8 is an embodiment of retry processing indicated generally at block 523 of FIG. 5. If, as determined at decision block 801, the preferred network is scheduled for retry, the mobile device searches for the preferred network, at block 803. If, as determined at decision block 805, the preferred network is found, the mobile device registers with the preferred network, at block 807. If, as determined at decision block 805, the preferred network is not found, the mobile device determines, at decision block 809, if the non-preferred network is scheduled for retry. If not, processing returns to block 801. If the non-preferred network is scheduled for retry, the mobile device searches for the non-preferred network, as indicated at block 811. If, as determined at decision block 813, the non-preferred network is found, the mobile device registers with the non-preferred network, at block 815, and processing returns to block 801.

Returning to decision block 801, if the preferred network is not scheduled for retry, the mobile device determines, at decision block 817, if the non-preferred network is scheduled to retry. If so, the mobile device searches for the non-preferred network, as indicated at block 819. If, as determined at decision block 821, the non-preferred network is found, the mobile device registers with the non-preferred network, at block 823, and retry processing ends.

From the foregoing, it will be apparent to those skilled in the art that systems and methods according to the present invention are well adapted to overcome the shortcomings of the prior art. While the present invention has been described with reference to presently preferred embodiments, those skilled in the art, given the benefit of the foregoing description, will recognize alternative embodiments. Accordingly, the foregoing description is intended for purposes of illustration and not of limitation.

What is claimed is:

1. A method of establishing communication with a mobile device, which method comprises:
    establishing a first identity for said mobile device;
    establishing a second identity for said mobile device;
    registering said mobile device with a first network using said first identity;
    designating one of said identities as a preferred identity, wherein said preferred identity is designated according to user preferences, and wherein said user preferences include at least one exception defining when the identity that is not the preferred identity is utilized to place calls from the mobile device rather than the preferred identity, wherein said at least one exception includes one of a preset time exception and a preset date exception; and
    simultaneously registering said mobile device with a second network using said second identity, said second identity being different from said first identity, wherein said mobile device is able to remain simultaneously registered with first and second networks in order to receive calls at substantially a same time for both the first and the second identities, and at any time for either the first and the second identities.

2. The method as claimed in claim 1, wherein said first network is the same as said second network.

3. The method as claimed in claim 1, further comprising:
    receiving a command to place a call from said mobile device; and
    placing said call from said mobile device using said preferred identity.

4. The method as claimed in claim 3, further comprising:
prior to placing said call from said mobile device using said preferred identity:
- prompting a user to override said preferred identity; and
- in response to said user overriding said preferred identity, placing said call from said mobile device using the identity not designated as said preferred identity.

5. The method as claimed in claim 1, further comprising:
receiving a call from a calling party, said call being for an intended one of said identities; and
completing said call to said intended one of said identities.

6. The method as claimed in claim 5, further comprising:
designating one of said identities as a preferred identity;
if said intended one of said identities is not said preferred identity, instructing said calling party to call said preferred identity.

7. The method as claimed in claim 1, wherein:
the first identity is established using a first subscriber identity module; and
the second identity is established using a second subscriber identity module.

8. A mobile device, which comprises:
a controller coupled to first identification circuitry and second identification circuitry and which performs the functions of:
receiving first identification circuitry, said first identification circuitry being associated with a first network;
receiving second identification circuitry, said second identification circuitry being associated with a second network;
establishing a first identity for said mobile device associated with the first identification circuitry;
establishing a second identity for said mobile device associated with the second identification circuitry;
designating one of said identification circuitry as a preferred identification circuitry, wherein said preferred identification circuitry is designated according to user preferences, and wherein said user preferences include at least one exception defining when the identity that is not the preferred identity is utilized to place calls from the mobile device rather than the preferred identity, wherein said at least one exception includes one of a preset time exception and a preset date exception;
registering said mobile device with said first network using said first identification circuitry with said first identity; and
simultaneously registering said mobile device with said second network using said second identification circuitry with said second identity, wherein said mobile device is able to remain simultaneously registered with first and second networks in order to receive calls at substantially a same time for both the first identification circuitry and the second identification circuitry and at any time for either identification circuitry.

9. The mobile device as claimed in claim 8, wherein:
the first identification circuitry comprises a first subscriber identity module; and
the second identification circuitry comprises a second subscriber identity module.

10. The mobile device as claimed in claim 8, wherein the controller further performs the functions of:
receiving a command to place a call; and
placing said call using said preferred identification circuitry.

11. The mobile device as claimed in claim 8, wherein said first network is different from said second network.

12. The mobile device as claimed in claim 8, wherein the controller further provides maintaining user preferences.

13. The mobile device as claimed in claim 12, wherein said user preferences include preferred identification circuitry.

14. The mobile device as claimed in claim 13, wherein said user preferences include exceptions to said preferred identification circuitry which exceptions define when the identification circuitry that is not the preferred identification circuitry is utilized to place calls from the mobile device rather than the preferred identification circuitry.

* * * * *